United States Patent
Figueroa et al.

(10) Patent No.: US 11,470,755 B2
(45) Date of Patent: Oct. 18, 2022

(54) ADJUSTABLE ROLLING BASKET ASSEMBLY

(71) Applicant: Deere & Company, Moline, IL (US)

(72) Inventors: Carlos Alberto Figueroa, Monterrey (MX); Humberto Moreno, Monterrey (MX); Shawn J. Becker, Ankeny, IA (US); Enrique Garza, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 334 days.

(21) Appl. No.: 16/664,249

(22) Filed: Oct. 25, 2019

(65) Prior Publication Data
US 2020/0146201 A1    May 14, 2020

Related U.S. Application Data

(60) Provisional application No. 62/759,984, filed on Nov. 12, 2018.

(51) Int. Cl.
| | | |
|---|---|---|
| *A01B 63/24* | (2006.01) | |
| *A01B 27/00* | (2006.01) | |
| *A01B 49/02* | (2006.01) | |

(52) U.S. Cl.
CPC ............ *A01B 63/24* (2013.01); *A01B 27/005* (2013.01); *A01B 49/027* (2013.01)

(58) Field of Classification Search
CPC ....... A01B 49/02; A01B 27/005; A01B 63/24; A01B 63/008; A01B 63/111
See application file for complete search history.

(56) References Cited

U.S. PATENT DOCUMENTS

| | | | | |
|---|---|---|---|---|
| 3,415,326 | A * | 12/1968 | Cafferty | A01B 61/046 172/269 |
| 3,480,086 | A * | 11/1969 | Groenke | A01B 35/12 172/710 |
| 3,972,374 | A * | 8/1976 | Venable | A01B 61/044 172/261 |
| 4,127,341 | A * | 11/1978 | Stevens | A01B 61/046 172/178 |
| 4,368,783 | A * | 1/1983 | Hake | A01B 49/02 172/198 |
| 4,418,761 | A * | 12/1983 | Dietrich, Sr. | A01B 29/00 172/271 |
| 4,700,785 | A * | 10/1987 | Bartusek | A01B 61/046 111/84 |
| 5,080,178 | A * | 1/1992 | Dietrich, Sr. | A01B 21/086 172/153 |
| 5,427,183 | A * | 6/1995 | Parker | A01B 61/046 172/264 |
| 6,502,644 | B2 * | 1/2003 | Steinlage | A01B 15/025 111/195 |

(Continued)

*Primary Examiner* — Jessica H Lutz
(74) *Attorney, Agent, or Firm* — Michael Best and Friedrich LLP

(57) ABSTRACT

An implement including a first frame member, a second frame member movable with respect to the first frame member, and a rolling basket rotatably coupled to the second frame member for rotation about a first axis of rotation. The implement also includes a biasing member configured to move the first axis of rotation toward a rest position, and where the rest position is adjustable relative to the first frame portion.

15 Claims, 7 Drawing Sheets

(56) References Cited

U.S. PATENT DOCUMENTS

| | | | | |
|---|---|---|---|---|
| 6,688,405 | B2* | 2/2004 | Steinlage | A01B 23/043 |
| | | | | 172/586 |
| 6,871,709 | B2* | 3/2005 | Knobloch | A01B 49/027 |
| | | | | 172/145 |
| 6,926,093 | B1* | 8/2005 | Fink | A01B 63/26 |
| | | | | 172/261 |
| 7,156,186 | B2* | 1/2007 | Knobloch | A01B 13/025 |
| | | | | 172/540 |
| 7,766,093 | B2* | 8/2010 | Becker | A01B 63/32 |
| | | | | 172/133 |
| 8,635,962 | B2* | 1/2014 | Schilling | A01C 7/203 |
| | | | | 111/163 |
| 9,635,797 | B2* | 5/2017 | Kovach | A01B 29/048 |
| 9,686,900 | B2* | 6/2017 | Raetzman | A01B 61/046 |
| 9,930,822 | B2* | 4/2018 | Hagny | A01B 15/16 |
| 10,231,373 | B2* | 3/2019 | Casper | A01B 5/04 |
| 10,412,875 | B2* | 9/2019 | Kovach | A01B 63/008 |
| 10,624,253 | B2* | 4/2020 | Kovach | A01B 71/02 |
| 10,939,609 | B2* | 3/2021 | Schilling | A01B 63/008 |
| 10,952,362 | B2* | 3/2021 | Steinlage | A01B 29/048 |
| 11,140,805 | B2* | 10/2021 | Engel | A01B 49/02 |
| 2017/0339819 | A1* | 11/2017 | Kowalchuk | A01C 5/068 |
| 2020/0359545 | A1* | 11/2020 | Ptacek | A01C 5/068 |
| 2021/0259149 | A1* | 8/2021 | Zemenchik | A01C 21/007 |

\* cited by examiner

ADJUSTABLE ROLLING BASKET ASSEMBLY

CROSS-REFERENCE TO RELATED APPLICATIONS

This patent application claims priority to Provisional Patent Application No. 62/759,984 filed Nov. 12, 2018, which is hereby incorporated by reference.

FIELD

The present disclosure relates to a rolling basket for use with an implement, such as a farm implement, and more specifically an adjustable rolling basket assembly.

BACKGROUND

When working land, such as during or for farming, a rolling basket may be used to help pulverize clods and otherwise work the soil.

SUMMARY

In some embodiments, an implement includes a first frame member, a second frame member movable with respect to the first frame member, a rolling basket rotatably coupled to the second frame member, where the rolling basket is rotatable about a first axis of rotation, and a biasing member configured to move the first axis of rotation toward a rest position, and where the rest position is adjustable relative to the first frame portion.

The second frame member is pivotable relative to the first frame member via a second axis of rotation. The first axis of rotation is parallel to the second axis of rotation. Further comprising an adjustment rod extending between and coupled to both the first frame member and the second frame member. The biasing member extends between and is coupled to the adjustment rod and one of the first frame member and the second frame member. The first frame member includes a first mounting point and where the second frame member includes a second mounting point, where the adjustment rod is operatively coupled to the first mounting point and the second mounting point, and where the adjustment rod is configured to vary the distance between the first mounting point and the second mounting point. The biasing member generates a preload force, and where the preload force is adjustable independent of the location of the rest position. The implement is a tiller. Further comprising a hitch coupled to the first frame.

In some embodiments, an implement for use on a support surface, the implement includes a first frame member, a second frame member movable with respect to the first frame member, a rolling basket coupled to the second frame member and configured for rotation about a first axis of rotation, where the rolling basket is adjustable between a first position, in which the rolling basket is engaged with the support surface, and a second position, in which the rolling basket is disengaged from the support surface.

Further comprising a biasing member, where the biasing member bias the rolling basket into engagement with the support surface when the rolling basket is in the first position. The magnitude of the force applied by the biasing member is adjustable. The second frame member is pivotable relative to the first frame member. The rolling basket is adjustable between the first position and the second position by moving the second frame member relative to the first frame member. Further comprising one or more wheels rotatably coupled to a first frame member.

In some embodiments, an implement for use on a support surface, the implement includes a first frame member, a second frame member movable with respect to the first frame member, a rolling basket coupled to the second frame member for rotation about a first axis of rotation, and a biasing member configured to bias the rolling basket into engagement with the support surface, and where the magnitude of the force applied by the biasing member is adjustable.

The biasing member is configured to move the first axis of rotation toward a rest position, and where the location of the rest position is adjustable relative to the first frame member. The location of the rest position is adjustable independent of the magnitude of the force applied by the biasing member.

In some embodiments, an implement includes a first frame member including a first mounting point, a second frame member including a second mounting point, where the first frame member is movable relative to the second frame member, a rolling basket coupled to the second frame member for rotation about a first axis of rotation, an adjustment rod extending between and operatively coupled to the first mounting point and the second mounting point, the adjustment rod including a stop, and a biasing member extending between and in operable communication with the stop and one of the first mounting point and the second mounting point.

The adjustment rod is threadably coupled to one of the first mounting point and the second mounting point, and the adjustment rod is slidingly coupled to the other of the first mounting point and the second mounting point. The stop is adjustable relative to the adjustment rod. The first frame member is pivotable relative to the second frame member.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways. Directions, such as clockwise and counterclockwise, used herein are for illustrative purposes only.

This disclosure generally relates to an adjustable rolling basket assembly for use with an implement, such as a harrow and the like. More specifically, the adjustable rolling basket assembly includes one or more hinge assemblies able to independently vary the depth and force at which one or more baskets engage and agitate the soil of the field being worked. By doing so, the rolling basket assembly is able to accommodate different soil types and operating conditions thereby allowing the one or more baskets to better pulverize clods and leave coarse soil on the top of the support surface. Still further, the adjustability of the rolling basket assembly allows the one or more baskets to be altered between a deployed position, in which the one or more baskets engage the soil, and a stowed position, in which the one or more baskets do not engage the soil. These operating conditions allow the user to avoid clogging the basket when working in muddy conditions and/or disengage the basket when the user does not want to use the basket assembly.

Figure 1:
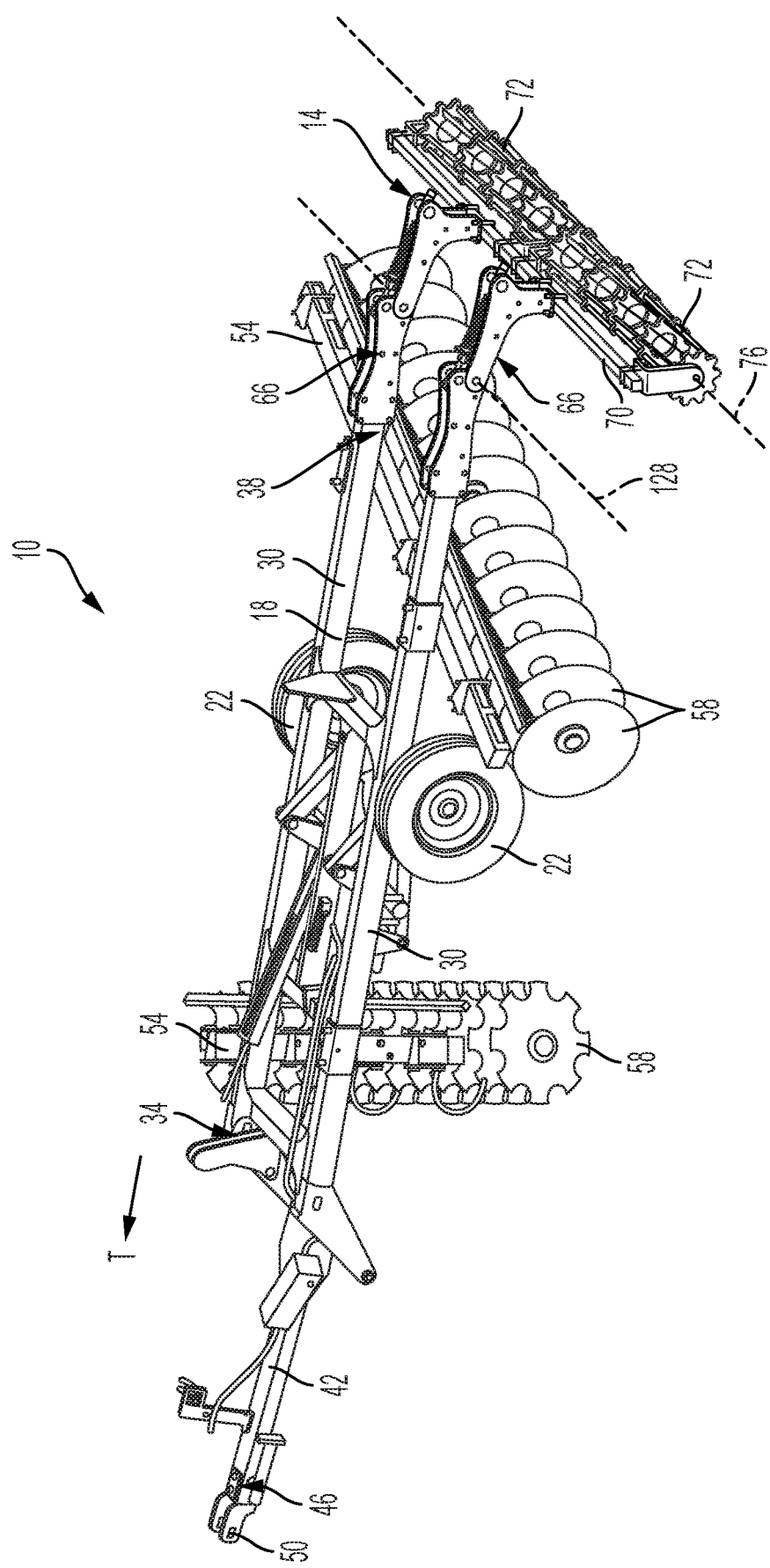
FIG. 1 is a perspective view of an implement with an adjustable rolling basket assembly installed thereon.
Figure 2:
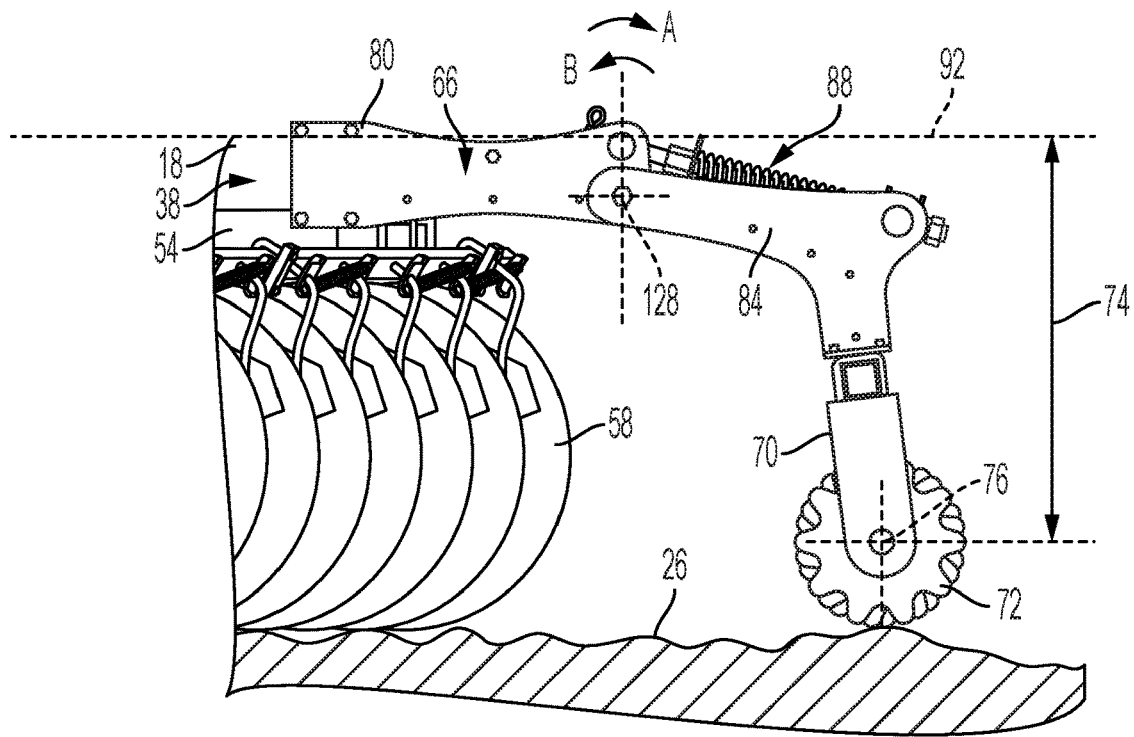
FIG. 2 is a detailed side view of the adjustable rolling basket assembly of FIG. 1 with the basket assembly in a deployed position.
Figure 3:
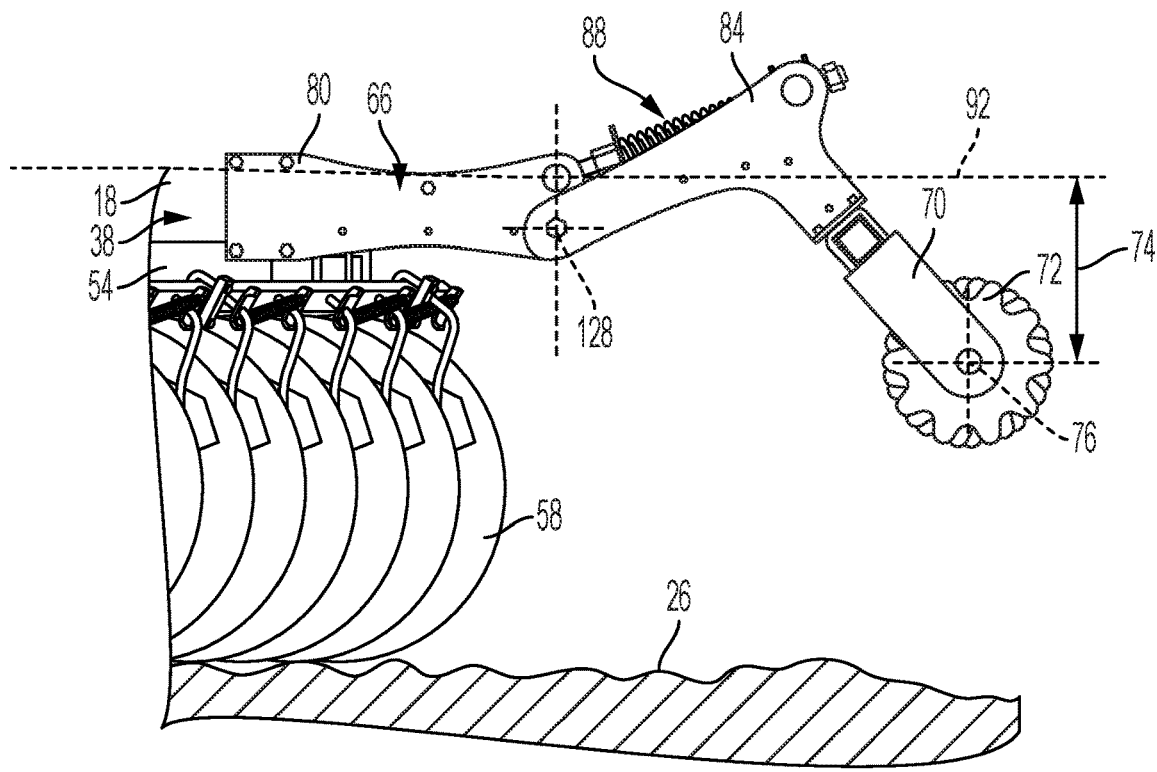
FIG. 3 is a detailed side view of the adjustable rolling basket assembly of FIG. 1 with the basket assembly in a stowed position.

Referring to FIGS. 1-3, an implement 10, such as a harrow and the like, is shown having an adjustable rolling basket assembly 14 mounted thereon. In the illustrated implementation, the implement 10 includes a frame 18, one or more wheels 22 coupled to the frame 18 to selectively support the implement 10 for movement over a support surface 26 (e.g., ground, as shown in FIGS. 2 and 3), and an adjustable rolling basket assembly 14 coupled to the frame 18 and configured to selectively engage the support surface 26 during operation.

As shown in FIG. 1, the frame 18 of the implement 10 includes a plurality of frame rails 30, each substantially elongated in shape and coupled to one-another to produce a forward end 34 generally facing the direction of travel T of the implement 10, and a rear end 38 opposite the forward end 34. The frame 18 also includes a tongue 42 extending from the forward end 34, e.g., substantially parallel to the direction of travel T, to produce a distal end 46 having a hitch 50 mounted thereon. During use, the hitch 50 is used to couple the implement 10 to a tractor or other exterior power unit (not shown) for towing. In alternative implementations, the tractor or power unit may be integrated into the implement (not shown) such that the implement is self-propelled.

The implement 10 also includes a plurality of booms 54, each coupled to the frame 18, e.g., transversely to the direction of travel T, and having one or more disks 58 or other ground engaging tools coupled thereto. During use, the implement 10 is moved, e.g., towed, along or across the support surface 26 in the direction of travel T causing the disks 58 to selectively engage and agitate the soil of the support surface 26. While the illustrated implement 10 incorporates a harrow, it is to be understood that the various rolling basket assemblies disclosed herein may be mounted on or incorporated into alternative types of implements 10, such as, but not limited to, tillers, seeders, plows, and the like.

As shown in FIGS. 1-9, the rolling basket assembly 14 includes a subframe 70 formed from a series of elongated members, one or more baskets 72 mounted to the subframe 70 for rotation about a first axis of rotation 76, and one or more hinge assemblies 66 extending between and movably coupling the subframe 70 to the rear end 38 of the frame 18.

In the illustrated implementation, the rolling basket assembly 14 includes two hinge assemblies 66 each coupled to and at least partially supporting the subframe 70. In alternative implementations, more or fewer hinge assemblies 66 may be present to support the subframe 70 during operation. For example, in some implementations the rolling basket assembly 14 includes a single hinge assembly 66. In other implementations, the rolling basket assembly 14 may include more than two hinge assemblies 66, e.g., three, four, five, six, seven, eight, or more than eight hinge assemblies 66.

As shown in FIGS. 2 and 3, a real-time basket depth 74 is defined as the vertical distance between the first axis of rotation 76 and a first plane 92. The first plane 92, in turn, includes a generally horizontal plane fixed relative to the frame 18 of the implement 10.

In the illustrated implementation, the rolling basket assembly 14 is oriented such that the first axis of rotation 76 is transverse or perpendicular, e.g., generally transverse or generally perpendicular, to the direction of travel T allowing the one or more baskets 72 to "roll" as the implement 10 travels across the support surface 26 in the direction of travel T (see FIG. 1).

Each hinge assembly 66 of the rolling basket assembly 14 is configured to adjustably couple the subframe 70 to the frame 18 of the implement 10 for relative movement therebetween. Each hinge assembly 66 includes a first frame member 80 coupled, e.g., fixedly coupled, to the rear end 38 of the frame 18, a second frame member 84 movable with respect to the first frame member 80, and an adjustment mechanism 88 extending between and coupled to both the first frame member 80 and the second frame member 84 to at least partially direct the relative movement therebetween. In the illustrated implementation, the subframe 70 is coupled to the second frame member 84 allowing the second frame member 84, the subframe 70, the one or more baskets 72, and the first axis of rotation 76 to all move together as a unit. In alternative implementations, the one or more baskets 72 may be mounted directly to the second frame member 84.

Figure 4:
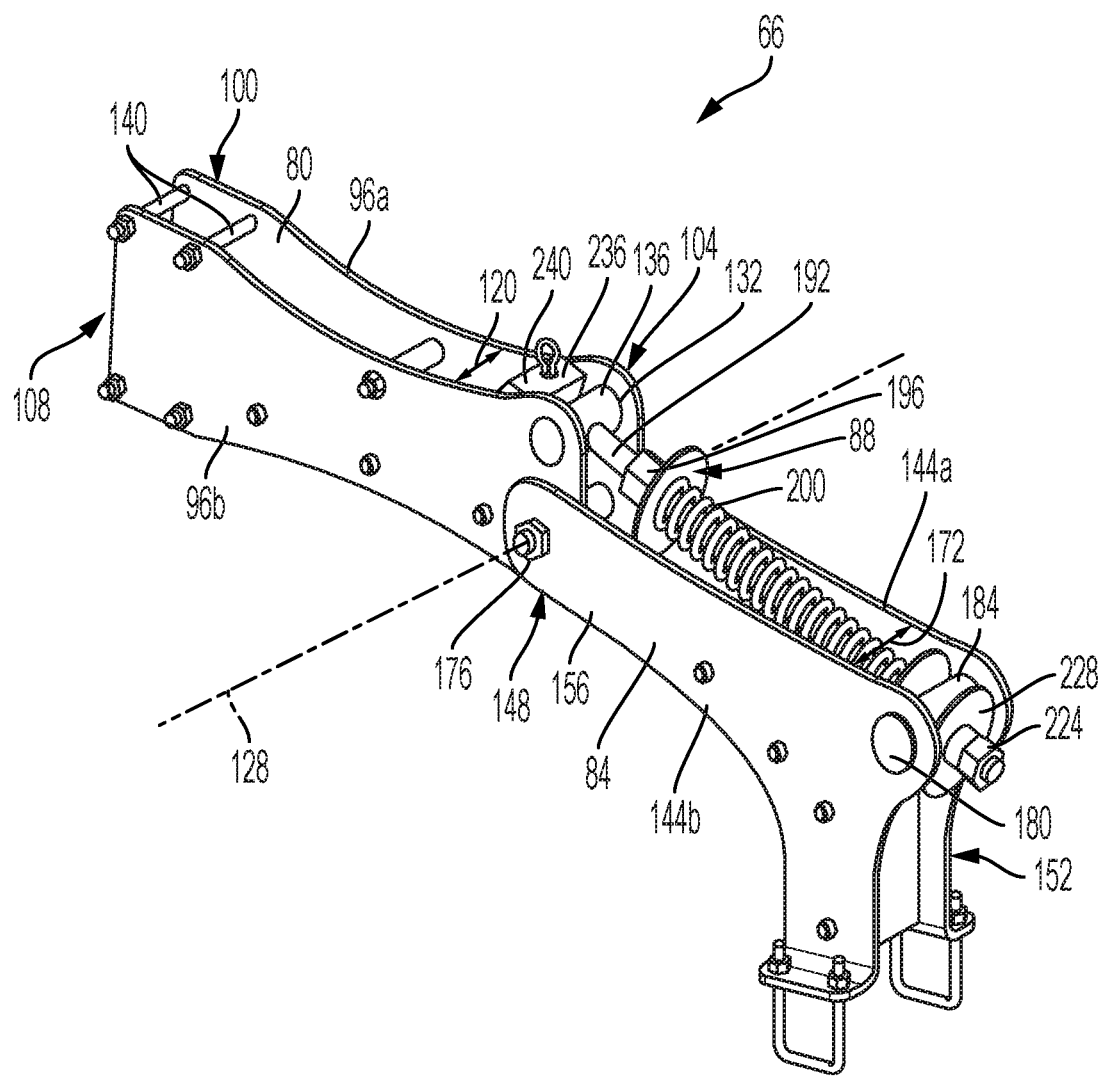
FIG. 4 is a perspective view of a hinge assembly of the adjustable rolling basket assembly of FIG. 1.
Figure 5:
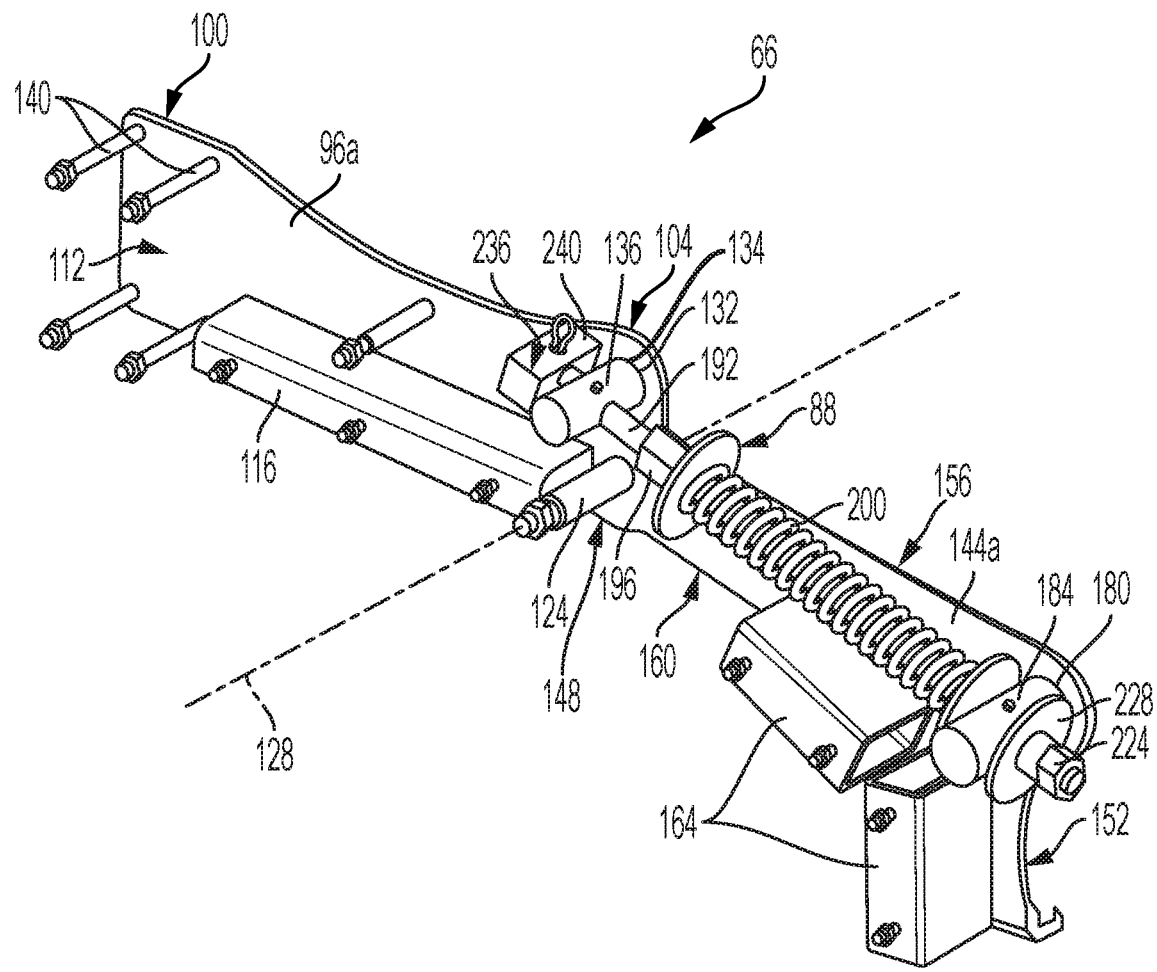
FIG. 5 is a perspective view of the hinge assembly of FIG. 4 with plate members removed for more clarity.

As shown in FIG. 4, the first frame member 80 of the hinge assembly 66 includes a number of plate members, e.g., two plate members 96a, 96b, each having a first end 100 secured, e.g., fixedly coupled or fixed, to the rear end 38 of the frame 18, a second end 104 opposite the first end 100, an outer surface 108, and an inner surface 112 opposite the outer surface 108 (shown in FIG. 5). The first frame member 80 may also include one or more cross-members 116 extending between and coupled to both plate members 96a, 96b. When assembled, the plate members 96a, 96b are oriented such that the inner surfaces 112 of the plate members 96a, 96b are substantially parallel to and spaced a distance from one another to create a first gap 120 therebetween. In the illustrated implementation, the inner surfaces 112 of both plate members 96a, 96b are oriented substantially parallel to the direction of travel T. While not shown, the plate members 96a, 96b may include grooves, ribs, or bends formed therein for additional strength.

Together, the plate members 96a, 96b define a pair of pivot apertures 122 (see FIG. 7) each positioned proximate to the second end 104 thereof and configured to support a pivot rod 124 that, in turn, defines a second pivot axis 128. In the illustrated implementation, the second pivot axis 128 is parallel, e.g., substantially parallel, to the first axis of rotation 76 (see FIG. 1). In some implementations, the second pivot axis 128 is perpendicular, e.g., generally transverse or generally perpendicular, to the direction of travel T and/or the frame rails 30. While the illustrated plate members 96a, 96b support a pivot rod 124, in alternative implementations a bushing (not shown) or other support element may be used to supplement the pivot rod 124 and increase the strength of the joint between the first frame member 80 and the second frame member 84.

As shown in FIG. 4, the plate members 96a, 96b also include a first mounting point 132 configured to rotatably support a first trunnion 136 therein (described elsewhere herein). More specifically, the first mounting point 132 is configured to allow the first trunnion 136 to rotate relative to the plate members 96a, 96b while restricting translational movement of the first trunnion 136 with respect thereto. In the illustrated implementation, the first mounting point 132 includes a pair of apertures 134 formed in the plate members 96a, 96b and sized to receive at least a portion of the first trunnion 136 therein. In alternative implementations, other forms of connection, e.g., rotatable or other joints, may be used.

While the first frame member 80 is shown as being formed separately from the frame 18 of the implement 10 and coupled, e.g., fixed, thereto with one or more fasteners 140, it is to be understood that, in alternative implementations, the first frame member 80 may be formed integrally with the frame 18 of the implement 10. In still other implementations, the rolling basket assembly 14 may also be formed as a standalone unit (not shown) and attached to a tractor or other exterior power unit (not shown) for towing. In still other implementations, the basket assembly 14 may be directly mounted to the tractor itself.

With reference to FIGS. 4-5, the second frame member 84 of the hinge assembly 66 includes a number of plate members, e.g., two plate members 144a, 144b, each having a first end 148, a second end 152 opposite the first end 148, an outer surface 156, and an inner surface 160 opposite the outer surface 156. The second frame member 84 may also include one or more cross-members 164 each extending between and coupled to the plate members 144a, 144b. When assembled, the plate members 144a, 144b, are oriented such that the inner surfaces 160 of each plate 144a, 144b are substantially parallel to and spaced a distance from one another to create a second gap 172 therebetween. While not shown, the plate members 144a, 144b may include grooves, ribs, or bends formed therein for additional strength.

Together, the plate members 144a, 144b of the second frame member 84 define a pair of pivot apertures 176 each positioned proximate a respective first end 148 thereof and configured to rotationally receive at least a portion of the pivot rod 124 therein. The resulting joint, in turn, allows the second frame member 84 to move (e.g., rotate) relative to the first frame member 80. While the illustrated hinge assembly 66 is shown having a pivoting joint, it is to be understood that in alternative implementations alternative forms of joints and interaction between the first frame member 80 and the second frame member 84 may be used. In one example, a four bar linkage (not shown) may extend between the two frame members 80, 84. In another implementation, a sliding linkage (not shown) may be used to connect the two frame members 80, 84. In still other implementations, other forms of joints may be used. In still other implementations, a combination or combinations of joints, e.g., the joints discussed herein, may be present. As indicated above, the plate members 144a, 144b may also be configured to support a bushing or other elements to strength the joint beyond the pivot rod 124 itself.

The plate members 144a, 144b also include a second mounting point 180 configured to rotatably support a second trunnion 184 therein. More specifically, the second mounting point 180 is configured to allow the second trunnion 184 to rotate relative to the plate members 144a, 144b while restricting translational movement with respect thereto. In the illustrated implementation, the second mounting point 180 includes a pair of apertures 182 formed in the plate members 144a, 144b and sized to receive at least a portion of the second trunnion 184 therein. In alternative implementations, other forms of connection may be used. In the illustrated implementation, the second mounting point 180 is positioned proximate to the first end 148 of the second frame member 84.

Figure 7:
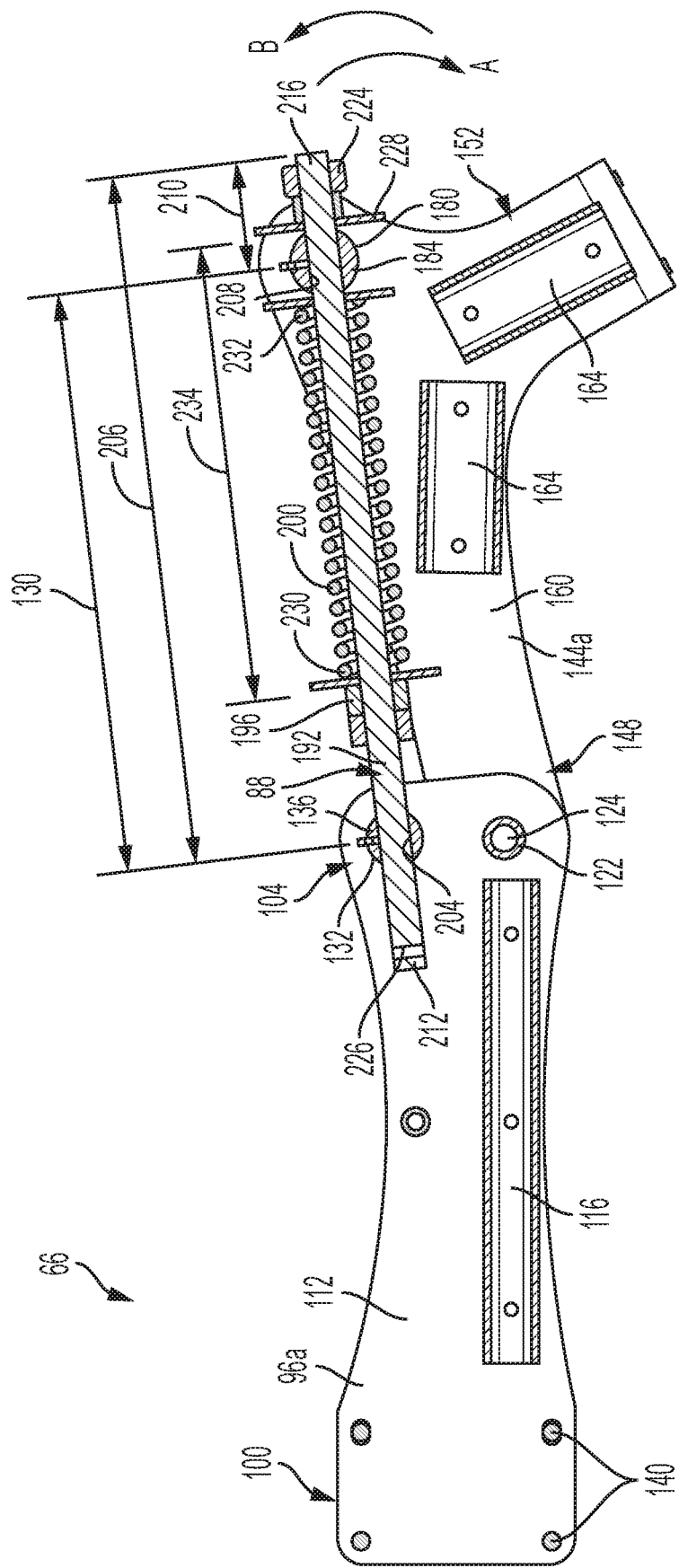
FIG. 7 is a side view of the hinge assembly of FIG. 4 with plate members removed for clarity.
Figure 8:
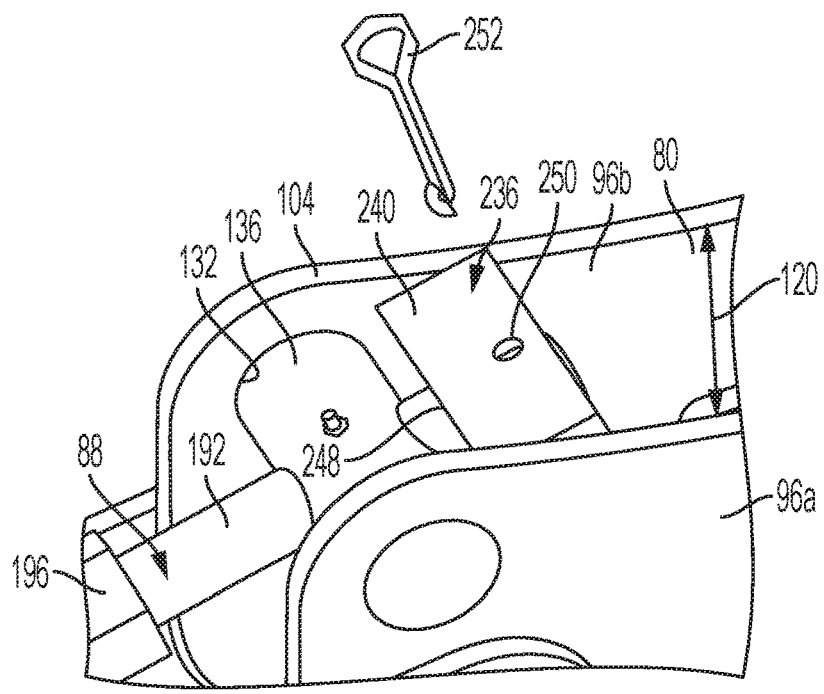
FIG. 8 is a detailed view of the hinge assembly of FIG. 4 with a rotation lock in a disengaged configuration.
Figure 9:
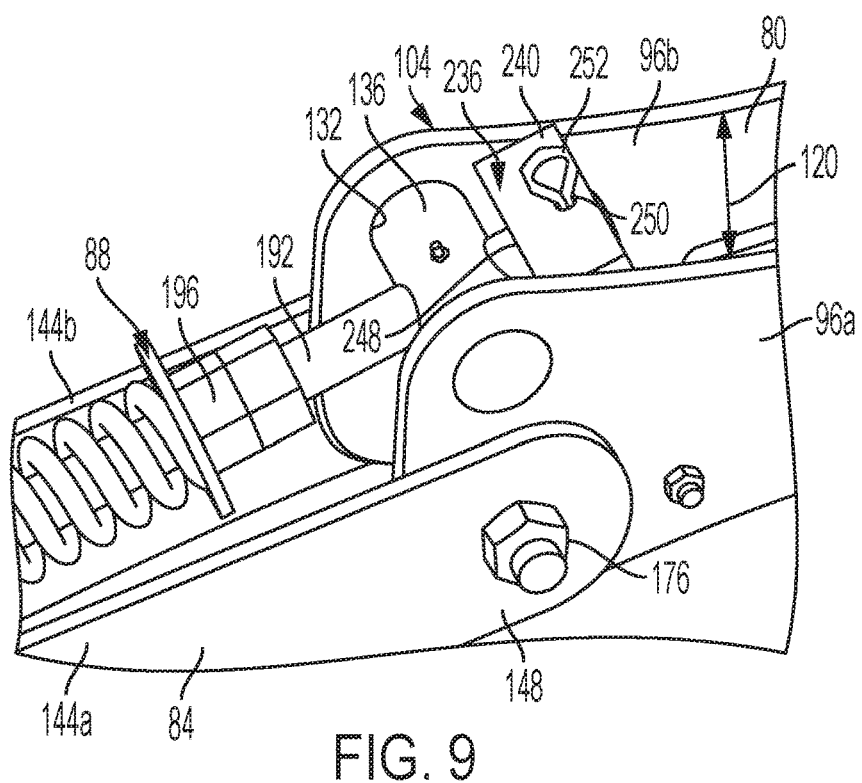
FIG. 9 is a detailed view of the hinge assembly of FIG. 4 with the rotation lock in an engaged configuration.

As shown in FIG. 7, the hinge assembly 66 defines a mounting distance 130 generally defined as the distance between the first mounting point 132 and the second mounting point 180. During use, varying the mounting distance 130 causes the second frame member 84 to rotate relative to the first frame member 80 about the second pivot axis 128. More specifically, increasing the mounting distance 130 causes the second frame member 84 to rotate in a first direction A, causing the first axis of rotation 76 to move closer to the support surface 26, e.g., to increase the real-time basket depth 74, (see FIG. 2). By contrast, decreasing the mounting distance 130 causes the second frame member 84 to rotate in a second direction B, opposite the first direction A, causing the first axis of rotation 76 to move away from the support surface 26, e.g., to decrease the real-time basket depth 74.

Figure 6:
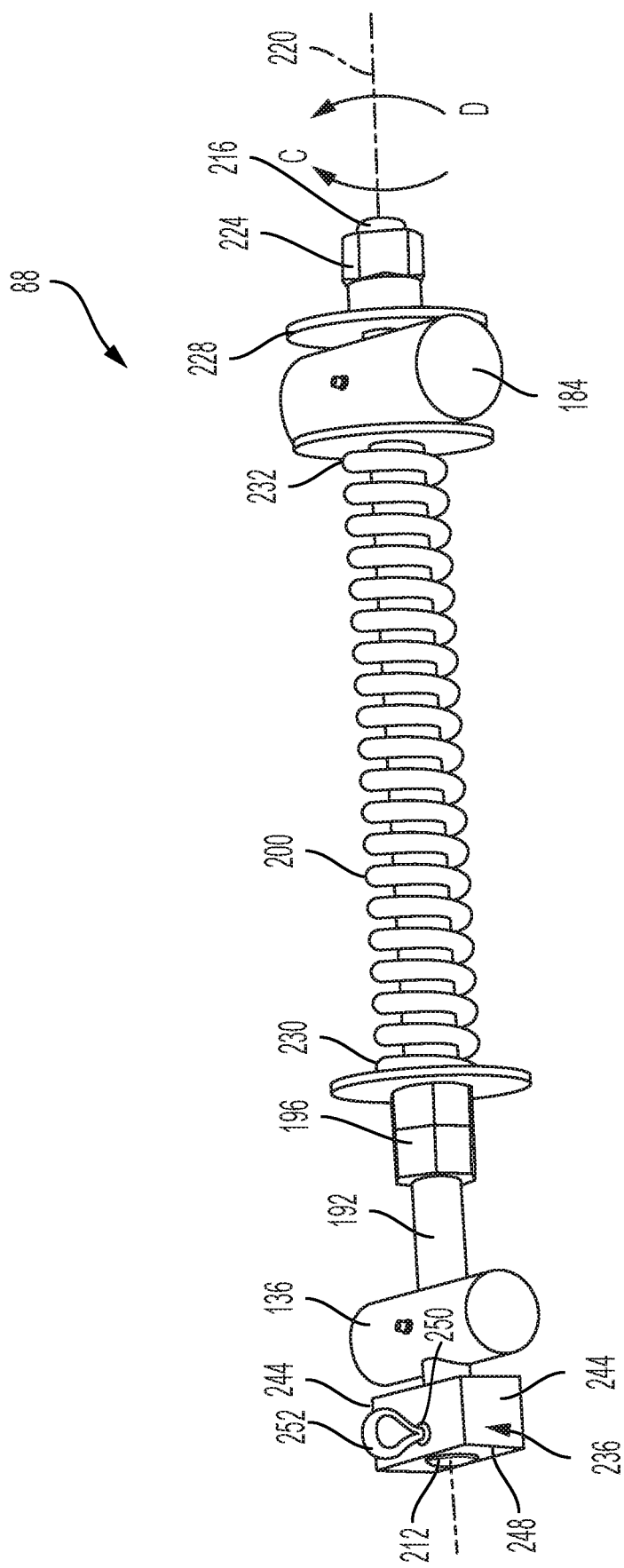
FIG. 6 is a perspective view of the adjustment mechanism of the hinge assembly of FIG. 4.

The adjustment mechanism 88 of the hinge assembly 66 extends between and is coupled to the first mounting point 132 of the first frame member 80 and the second mounting point 180 of the second frame member 84, and is configured to vary the mounting distance 130, e.g., during use. With reference to FIG. 6, the adjustment mechanism 88 includes a first trunnion 136 configured to be operably coupled to the first mounting point 132 of the first frame member 80, a second trunnion 184 configured to be operably coupled to the second mounting point 180 of the second frame member 84, an adjustment rod 192 extending between and in operable communication with both the first trunnion 136 and the second trunnion 184, an adjustable stop 196 adjustably mounted to the adjustment rod 192, and a biasing member 200 extending between and in operable communication with the adjustable stop 196 and the second trunnion 184.

The first trunnion 136 of the adjustment mechanism 88 is substantially cylindrical in shape defining a threaded aperture 204 therethrough (see FIG. 7). The first trunnion 136 may be mounted to the first frame member 80 such that it is able to freely rotate with respect to the first frame member 80 but is restricted from translational movement relative thereto. When assembled, the first trunnion 136 threadably receives at least a portion of the adjustment rod 192 therein such that axial forces may be conveyed therebetween. The first trunnion 136 also defines a first trunnion distance 206 (see FIG. 7) defined as the distance between the first trunnion 136 and the second end 216 of the adjustment rod 192.

The second trunnion 184 of the adjustment mechanism 88 is substantially cylindrical in shape defining a non-threaded aperture 208 therethrough (see FIG. 7). The second trunnion 184 may be mounted to the second frame member 84 such that it is able to freely rotate with respect to the second frame member 84 but is restricted from translational movement with respect thereto. When assembled, the second trunnion 184 slidably receives at least a portion of the adjustment rod 192 therein allowing the second trunnion 184 to slide axially along at least a portion of the length of the adjustment rod 192. The second trunnion 184 defines a second trunnion distance 210 (see FIG. 7) defined as the distance between the second trunnion 184 and the second end 216 of the adjustment rod 192. The second trunnion 184 may be heat treated to produce a hardened exterior and softer, ductile interior. As such, the second trunnion 184 may be able to resist wear (e.g., via the hard exterior) while remaining sufficiently strong to resist breakage during use.

While the illustrated implementation shows the first trunnion 136 coupled to the first mounting point 132 and the second trunnion 184 coupled to the second mounting point 180, it is to be understood that in some implementations the opposite may be true.

The adjustment rod 192 of the adjustment mechanism 88 includes an elongated body having a first end 212, a second end 216 opposite the first end 212, and defines an axis 220 extending therethrough (see FIG. 6). When the adjustment mechanism 88 is assembled, the adjustment rod 192 is mounted such that the first end 212 is threaded into or through the threaded aperture 204 of the first trunnion 136 and the second end 216 is slidably inserted into or through the non-threaded aperture 208 of the second trunnion 184. As such, the adjustment rod 192 may axially slide relative to the second trunnion 184 but is threadably fixed to the first trunnion 136 requiring the adjustment rod 192 to be rotated about its axis 220 to create relative axial movement therebetween. More specifically, the adjustment rod 192 may be threaded such that rotating the adjustment rod 192 in a first direction C about the axis 220 causes the first trunnion 136 to move axially toward the first end 212 (e.g., increasing the first trunnion distance 206) while rotating the adjustment rod 192 in a second direction D about the axis 220 causes the first trunnion to move axially toward the second end 216 (e.g., decreasing the first trunnion distance 206).

The adjustment rod 192 includes external threads formed onto the outer surface thereof. In some implementations, the adjustment rod 192 is threaded over its entire length. In other implementations, the adjustment rod 192 is partially threaded having external threads over a portion of its axial length. In still other implementations, alternative forms of adjustable engagement may be employed between the adjustment rod 192 and the first trunnion 136 such as, but not limited to, multiple spaced apart locking apertures, locking pins, ratchet teeth, and the like.

The adjustment rod 192 may also include a drive member 224 coupled proximate the second end 216 thereof and rotatable together therewith. During use, the drive member 224 provides an adjustment point, allowing a user to impart torque, e.g., manually, onto the adjustment rod 192 and induce rotation about its axis 220. In some implementations, the drive member 224 includes a fastener, e.g., a hexagonal nut, fixedly coupled (e.g., welded) to the second end 216 of the adjustment rod 192 allowing a tool, e.g., a wrench or impact gun, to rotate the adjustment rod 192 about its axis 220 in either the first direction C or the second direction D. While the illustrated drive member 224 includes a hexagonal nut configured to interact with a standard socket or impact wrench, in alternative implementations other forms of drive members may be used to permit the user to rotate the adjustment rod 192 about its axis 220 by a separate tool. In other implementations, the drive member 224 may include an integrated handle and/or the like to allow the user to manually rotate the adjustment rod 192 about its axis 220 without the need of a separate tool.

In still other implementations, the drive member 224 may be active, e.g., automated, allowing the adjustment rod 192 to rotate about its axis 220 automatically at least partially under the control of a separate control system (not shown).

In such implementations, the drive member 224 may include a motor, actuator, and/or the like in operable communication with the adjustment rod 192 via a gear set, belts, chains, and/or the like.

The adjustment rod 192 may also include one or more cross-channels 226 (see FIG. 7) positioned proximate the first end 212 thereof. The cross-channels 226 may be oriented at an angle, e.g., substantially perpendicular, relative to the axis 220. Each cross-channel 226 may advantageously be generally angularly offset from other cross-channels 226, e.g., any and/or every other cross-channel 226, and may extend completely through the adjustment rod 192, e.g., be open on both ends.

As shown in FIG. 6, the adjustment mechanism includes an end stop 228 mounted to, e.g., at least partially around, the adjustment rod 192 and positioned axially between the second trunnion 184 and the second end 216. During use, the end stop 228 is configured to selectively engage the second trunnion 184 and limit to how far the second trunnion 184 can travel toward the second end 216. While the illustrated end stop 228 is shown as a separate device or component, it is to be understood that in alternative implementations, the end stop 228 may be integrally formed with the adjustment rod 192. Still further, in some implementations the end stop 228 may be adjustable.

As shown in FIGS. 4-7, the biasing member 200 of the adjustment mechanism 88 includes a coil spring having a first end 230, and a second end 232 opposite the first end 230. When the hinge assembly 66 is assembled, the biasing member 200 is mounted axially over the adjustment rod 192, e.g., coaxially with the adjustment rod 192, with the first end 230 held by the adjustable stop 196, e.g., in contact with or abutting the adjustable stop 196, and the second end 232 held by the second trunnion 184, e.g., in contact with or abutting the second trunnion 184 (see FIG. 6). More specifically, the biasing member 200 may be compressed between the adjustable stop 196 and the second trunnion 184 causing the biasing member 200 to apply a force against the second trunnion 184 generally in the direction of the second end 216 of the adjustment rod 192 and into engagement with the end stop 228 (described herein). In the illustrated implementation, the biasing member 200 includes a coil spring. In alternative implementations, different forms of biasing force such as a gas shock, resilient bands, and/or the like may be used.

As shown in FIGS. 4-7, the adjustable stop 196 of the adjustment mechanism 88 includes a member operatively mounted to the adjustment rod 192 that is both continuously adjustable along at least a portion of the axial length thereof and configured to act as a stop for the first end 230 of the biasing member 200. More specifically, the adjustable stop 196 is threadably coupled to the adjustment rod 192 such that it can be moved axially along the length, e.g., at least a portion of the length, of the adjustment rod 192 (e.g., by rotating the adjustable stop 196 relative to the adjustment rod 192), but, once in position, the adjustable stop 196 restricts axial movement between the adjustable stop 196 and the adjustment rod 192. By doing so, the adjustable stop 196 acts as a rigid or fixed end point, e.g., anchor, for the first end 230 of the biasing member 200 during use and transmits forces applied thereto to the adjustment rod 192. In the illustrated implementation, the adjustable stop 196 includes a pair of locking nuts that can be jammed into engagement with one another to "lock" the stop in place and minimize the risk that the stop 196 will move undesirably during use.

In other implementations, the adjustable stop 196 may be locked into place using an external locking mechanism, and/or the like.

A stop distance 234 is defined as the distance between the adjustable stop 196 and the end stop 228. The stop distance 234 at least partially defines, e.g., contributes to, the magnitude of force applied by the biasing member 200 to the second trunnion 184 for a given axial location thereof. The stop distance 234 also at least partially defines a preload force applied to the second trunnion 184. The preload force is defined as the magnitude of the force applied to the second trunnion 184 by the biasing member 200 when the second trunnion 184 is in contact with the end stop 228. More specifically, the smaller the stop distance 234 (e.g., the closer the adjustable stop 196 is to the end stop 228) the greater the force applied by biasing member 200 for a given location of the second trunnion 184, e.g., to the second trunnion 184, and the greater the preload force. By contrast, the larger the stop distance 234 (e.g., the further the adjustable stop 196 is from the end stop 228) the smaller the force applied by the biasing member 200 for a given location of the second trunnion 184, e.g., to the second trunnion 184, and the smaller the preload force.

While the illustrated implementation includes a continuously adjustable stop 196, it is to be understood that in alternative implementations different forms of adjustment may be used between the adjustable stop 196 and the adjustment rod 192. For example, the adjustable stop 196 may be axially fixed relative to the adjustment rod 192 in a plurality of pre-determined stop locations. In such implementations, one or more of such pre-determined stop locations may be established with locking pin apertures, ratchet teeth, and/or the like.

As shown in FIGS. 4-7, the adjustment mechanism 88 may also include a rotation lock 236 operatively coupled to the adjustment rod 192 and configured to selectively resist rotation of the adjustment rod 192, e.g., rotation of the adjustment rod 192 relative to the first trunnion 136. More specifically, the rotation lock 236 is adjustable between an engaged configuration, in which the rotation lock 236 restricts the rotation of the adjustment rod 192 about its axis 220 relative to the first trunnion 136, and a disengaged configuration, in which the adjustment rod 192 is free to rotate about its axis 220 relative to the first trunnion 136.

As shown in FIGS. 4-6, the rotation lock 236 includes a block 240 having sidewalls 244 sized to engage the inner surfaces 112 of the plate members 96a, 96b of the first frame member 80. The block 240 also includes a first aperture 248 sized to receive at least a portion of the adjustment rod 192 therein and/or therethrough, and a second aperture 250 extending at least partially through the block 240, e.g., intersecting with the first aperture 248. In some implementations, the second aperture 250 is oriented perpendicular to the first aperture 248. The second aperture 250 may be sized to receive a locking pin 252 therein and/or therethrough.

To place the rotation lock 236 in the engaged configuration (see FIG. 9), the block 240 may be positioned, e.g., at least partially positioned, within the first gap 120 positioning the sidewalls 244 of the block 240 adjacent to the inner surfaces 112 of the plate members 96a, 96b. The first end 212 of the adjustment rod 192 may be aligned and inserted, e.g., at least partially inserted, into and/or through the first aperture 248 in the block 240. Finally, the adjustment rod 192 may be rotated until one of the cross-channels 226 aligns with the second aperture 250 in the block 240.

Once positioned, the locking pin 252 may be inserted into and/or through both the second aperture 250 and the aligned cross-channel 226 causing the block 240 and adjustment rod 192 to become rotationally locked with respect to one another. By doing so, the adjustment rod 192 is restricted or prevented from rotating relative to the first trunnion 136 as attempts to rotate the adjustment rod 192 about its axis 220 will cause the sidewalls 244 of the block 240 to interfere or engage with the inner surfaces 112 of the plate members 96a, 96b. As such, when the rotation lock 236 is in the engaged configuration, the first trunnion 136 cannot be moved axially along the length of the adjustment rod 192 (e.g., the first trunnion distance 206 is fixed).

To place the rotation lock 236 in the disengaged configuration (see FIG. 8), the locking pin 252 may be removed from the second aperture 250 in the block 240 thereby allowing the adjustment rod 192 to rotate about its axis 220 relative to the block 240 and the first trunnion 136. As such, the adjustment rod 192 may be rotated to adjust the axial position of the first trunnion 136 thereon (e.g., the first trunnion distance 206 is adjustable).

The rolling basket assembly 14 is configured to bias the first axis of rotation 76 toward a pre-determined rest position and may be adjustable, e.g., dually adjustable, being able to independently adjust at least one of 1) the depth at which the one or more baskets 72 engage the support surface 26, e.g., soil (e.g., the resting basket depth of the first axis of rotation 76) and 2) the magnitude of force under which the one or more baskets 72 engage the support surface 26, e.g., soil (e.g., the preload force applied by the biasing member 200 against the second trunnion 184). The rolling basket assembly 14 may also be configured to allow the one or more baskets 72 and the first axis of rotation 76 to deflect from the rest position against the resistance force provided by the biasing member 200 in response to external stimuli (e.g., the real-time basket depth 74 may vary from the resting basket depth). For the purposes of this application, the rest or neutral position is defined as the position of the one or more baskets 72 and the first axis of rotation 76 when no external forces or stimuli are being applied to the rolling basket assembly 14. Similarly, the resting basket depth is defined as the real-time basket depth 74 produced when no external forces or stimuli are being applied to the rolling basket assembly 14. In the illustrated implementation, the rolling basket assembly 14 is in the rest position and produces the resting basket depth when the second trunnion 184 is biased into engagement with the end stop 228 (see FIG. 3).

To adjust the resting basket depth (described herein), the first trunnion distance 206 may be adjusted. To do so, an impact gun or other compatible tool may be placed onto the drive member 224 and a torque applied thereto, causing the adjustment rod 192 to rotate about its axis 220 in either the first direction C or the second direction D (shown in FIG. 6). This rotation, in turn, changes the first trunnion distance 206, which, in turn, changes the mounting distance 130, which, as described above, causes the resting basket depth to change. More specifically, the resting basket depth may be increased by applying torque to the drive member 224 in the first direction C and the resting basket depth may be decreased by applying torque to the drive member 224 in the second direction D. In some implementations, the hinge assemblies 66 may be operably connected to one another such that adjusting the trunnion distance 206 at one hinge assembly 66 causes the same adjustment to occur at one or more other hinge assemblies 66. Such implementations may be used to assure the basket depth 74 is adjusted evenly across the entire width of the basket assembly 14. In still other implementations, each hinge assembly 66 may be adjusted independently so that the operating conditions (e.g., basket depth 74 and preload force) can be varied along the width of the basket assembly 14.

To adjust the preload force (described herein), the stop distance 234 may be adjusted. More specifically, increasing the stop distance 234 (e.g., by moving the adjustable stop 196 away from the end stop 228) causes the preload force at the rest position to decrease while decreasing the stop distance 234 (e.g., by moving the adjustable stop 196 toward the end stop 228) causes the preload force to decrease.

The rolling basket assembly 14 may be further adjustable between a deployed or first position (see FIG. 2), in which the one or more baskets 72 are in contact with, or engaged with, the support surface 26, and a stowed or second position (see FIG. 3), in which the one or more baskets 72 are not in contact with, or are disengaged from, the support surface 26. In the illustrated implementation, the rolling basket assembly 14 may be adjusted between the deployed and stowed positions by adjusting the resting basket depth a sufficient distance until the one or more baskets 72 are no longer in contact with the support surface 26.

In alternative implementations, the rolling basket assembly 14 may include a quick-disconnect assembly (not shown) where the adjustment mechanism 88 is operatively disengaged from at least one of the first frame member 80 and the second frame member 84 allowing the second frame member 84 to be pivoted freely relative to the first frame member 80 about the second pivot axis 128 between the deployed and stowed positions—independent of the operation of the adjustment mechanism 88. In such implementations, the quick-disconnect assembly may include an alternative first trunnion (not shown) adjustable between an engaged configuration, in which the alternative first trunnion is operatively, e.g., threadably, engaged with the adjustment rod 192, and a disengaged configuration, in which the alternative first trunnion is not operatively, e.g., threadably, engaged with the adjustment rod 192 such that the alternative first trunnion and the adjustment rod 192 are able to freely move axially with respect to one another. Furthermore, the quick-disconnect assembly may also include a secondary lock system (not shown) operable independently of the adjustment mechanism 88 and configured to secure the rolling basket assembly 14 in the stowed position.

During operation, the rolling basket assembly 14 begins in the stowed position (see FIG. 3) with the one or more baskets 72 not in contact with, e.g., disengaged from, the support surface 26. To begin operations, the rolling basket assembly 14 may be placed into the engaged position by placing a torque driver or other compatible tool onto the drive member 224 and applying torque in the first direction C. As described herein, applying torque in the first direction C causes the resting basket depth to increase until the one or more baskets 72 are in contact with the support surface 26. Once in contact, the resting basket depth may be further adjusted by applying torque to the drive member 224 in either the first direction C or the second direction D, until the desired or selected resting basket depth is achieved.

With the resting basket depth set, the preload force may be independently adjusted to the desired level. To do so, the location of the adjustable stop 196 may be adjusted as described elsewhere herein. Once the desired level of resistance or preload force is achieved, the adjustable stop 196 may be locked in place, e.g., by jamming the two elements (which, as discussed, may be two nuts) into engagement with one another. In other implementations, the stop 196 may be locked in place using a separate locking element (not shown).

In alternative implementations, the adjustment of the resting basket depth and preload force may be actively controlled by a controller (not shown) in operable communication with the adjustment mechanism 88. More specifically, the controller may be in operable communication with one or more sensors (not shown) configured to detect, among other things, the first trunnion distance 206, the mounting distance 130, the stop distance 234, and/or the like. During use, the controller inputs the data provided by the one or more sensors into one or more predetermined algorithms and outputs signals to the drive member 224 and/or adjustable stop 196 to actively adjust the resting basket depth and preload force. In some implementations, the controller may be configured to adjust the resting basket depth and preload force to achieve a desired, e.g., input, value. In other implementations, the controller may be configured to adjust the resting basket depth and/or preload force at least partially dependent upon detected attributes of the support surface 26. In still other implementations, the controller may be configured to adjust each hinge assembly 66 either individually or as a unit.

With both parameters set, the implement may be towed or otherwise moved over the support surface 26 in the direction of travel T to cause the one or more baskets 72 to engage and work the support surface 26, e.g., clods in the soil. While doing so, external forces (such as bumps, rocks, changes in soil density, and/or the like) apply temporary and varying forces to the basket 72, which forces generally include a vertical component, e.g., a component of the varying forces is in a generally vertically upward direction. When a force is applied in this way, the force is transmitted to the second trunnion 184 by the second frame member 84. The second trunnion 184, in turn acts on/against the biasing member 200 causing the second trunnion distance 210 to increase and the biasing member 200 to compress. This action, in turn, causes the real-time basket depth 74 to vary from, e.g., become smaller than, the resting basket depth set by the user. The biasing member 200 then applies a proportionally increasing resistive force to the second trunnion 184 to resist the resulting movement.

After the force is removed, the second trunnion 184 is biased back toward the end stop 228 by the biasing member 200, causing the real-time basket depth 74 to move toward the resting basket depth.

After operations have completed, the rolling basket assembly 14 may be returned to the stowed position (if desired) by applying torque to the drive member 224 and rotating the adjustment rod 192 in the second direction D. As described herein, this rotation causes the resting basket depth to decrease and the one or more baskets 72 to disengage from the support surface 26.

The invention claimed is:

1. An implement comprising:
a first frame member;
a second frame member movable with respect to the first frame member;
a rolling basket rotatably coupled to the second frame member, wherein the rolling basket is rotatable about a first axis of rotation; and
a biasing member configured to move the first axis of rotation toward a rest position, wherein the rest position is adjustable relative to the first frame portion, wherein the biasing member generates a preload force, and wherein the preload force is adjustable independent of the location of the rest position.

2. The implement of claim 1, wherein the second frame member is pivotable relative to the first frame member via a second axis of rotation.

3. The implement of claim 2, wherein the first axis of rotation is parallel to the second axis of rotation.

4. The implement of claim 1, further comprising an adjustment rod extending between and coupled to both the first frame member and the second frame member.

5. The implement of claim 4, wherein the biasing member extends between and is coupled to the adjustment rod and one of the first frame member and the second frame member.

6. The implement of claim 4, wherein the first frame member includes a first mounting point and wherein the second frame member includes a second mounting point, wherein the adjustment rod is operatively coupled to the first mounting point and the second mounting point, and wherein the adjustment rod is configured to vary the distance between the first mounting point and the second mounting point.

7. The implement of claim 1, wherein the implement is a tiller.

8. The farm implement of claim 1, further comprising a hitch coupled to the first frame.

9. An implement for use on a support surface, the implement comprising:
 a first frame member;
 a second frame member movable with respect to the first frame member;
 a rolling basket coupled to the second frame member and configured for rotation about a first axis of rotation, wherein the rolling basket is adjustable between a first position, in which the rolling basket is engaged with the support surface, and a second position, in which the rolling basket is disengaged from the support surface; and
 a biasing member, wherein the biasing member biases the rolling basket into engagement with the support surface when the rolling basket is in the first position, and wherein the magnitude of the force applied by the biasing member is adjustable while the rolling basket is in the first position.

10. The implement of claim 9, wherein the second frame member is pivotable relative to the first frame member.

11. The implement of claim 9, wherein the rolling basket is adjustable between the first position and the second position by moving the second frame member relative to the first frame member.

12. The farm implement of claim 9, further comprising one or more wheels rotatably coupled to the first frame member.

13. An implement for use on a support surface, the implement comprising:
 a first frame member;
 a second frame member movable with respect to the first frame member;
 a rolling basket coupled to the second frame member for rotation about a first axis of rotation; and
 a biasing member configured to bias the rolling basket into engagement with the support surface, and wherein the magnitude of the force applied by the biasing member is adjustable independent of the relative position of the second frame member relative to the first frame member.

14. The implement of claim 13, wherein the biasing member is configured to move the first axis of rotation toward a rest position, and wherein the location of the rest position is adjustable relative to the first frame member.

15. The implement of claim 14, wherein the location of the rest position is adjustable independent of the magnitude of the force applied by the biasing member.

* * * * *